US012750193B2

(12) United States Patent
Li

(10) Patent No.: US 12,750,193 B2
(45) Date of Patent: Sep. 29, 2026

(54) METHOD FOR GENERATING SEMI-STATIC HARQ-ACK CODEBOOK, AND TERMINAL

(71) Applicant: VIVO MOBILE COMMUNICATION CO., LTD., Guangdong (CN)

(72) Inventor: Na Li, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 467 days.

(21) Appl. No.: 18/460,868

(22) Filed: Sep. 5, 2023

(65) Prior Publication Data

US 2023/0412347 A1 Dec. 21, 2023

Related U.S. Application Data

(63) Continuation of application No. PCT/CN2022/079863, filed on Mar. 9, 2022.

(30) Foreign Application Priority Data

Mar. 10, 2021 (CN) ......................... 202110262602.4

(51) Int. Cl.
*H04L 5/00* (2006.01)
*H04L 1/1812* (2023.01)

(52) U.S. Cl.
CPC .......... *H04L 5/0055* (2013.01); *H04L 1/1812* (2013.01)

(58) Field of Classification Search
CPC ... H04L 5/0055; H04L 1/1812; H04L 1/1664; H04L 1/1893; H04L 1/1896;
(Continued)

(56) References Cited

U.S. PATENT DOCUMENTS

2017/0347341 A1 11/2017 Zhang et al.
2020/0106566 A1 4/2020 Yeo et al.
(Continued)

FOREIGN PATENT DOCUMENTS

CN 110351837 A 10/2019
CN 110505040 A 11/2019
(Continued)

OTHER PUBLICATIONS

Huawei, HiSilicon, [38.331][H303][H304][H316][C125] Correction on dormant BWP "Discussion and Decision" 3GPP TSG-RAN WG2 Meeting#110-e R2-2005244, Jun. 1-12, 2020, Electronic.
(Continued)

*Primary Examiner* — Mang Hang Yeung
(74) *Attorney, Agent, or Firm* — Price Heneveld LLP

(57) ABSTRACT

A method and terminal for generating a semi-static HARQ-ACK codebook is disclosed, where the generation method includes: determining, based on at least one of $K_1$ sets corresponding to a first PDSCH and a second PDSCH, a $K_1$ set associated with an active UL BWP; determining, for each $K_{1,k}$ value in the $K_1$ set associated with the active UL BWP, based on at least one of TDRA tables corresponding to the first PDSCH and the second PDSCH, a candidate PDSCH reception occasion in a slot corresponding to each $K_{1,k}$ value; and determining, based on the candidate PDSCH reception occasion, the semi-static HARQ-ACK codebook.

17 Claims, 6 Drawing Sheets

| Row index (Row index, RI) | k0 | Start | Length | Mapping type |
|---|---|---|---|---|
| 0 | 0 | #2 | 4 | B |
| 1 | 0 | #6 | 4 | B |
| 2 | 0 | #10 | 4 | B |
| 3 | 0 | #0 | 13 | A |
| 4 | 0 | #4 | 2 | B |
| 5 | 0 | #6 | 2 | B |
| 6 | 0 | #8 | 2 | B |
| 7 | 0 | #10 | 2 | B |
| 8 | 0 | #12 | 2 | B |

(58) Field of Classification Search
CPC ........... H04L 2001/0093; H04L 1/1614; H04L 1/1861; H04L 1/1854; H04L 1/1607; H04L 5/0078
USPC ........................................................... 370/330
See application file for complete search history.

(56) References Cited

U.S. PATENT DOCUMENTS

| | | | |
|---|---|---|---|
| 2020/0358562 A1 | 11/2020 | Peng et al. | |
| 2021/0135793 A1 | 5/2021 | Xiao et al. | |
| 2021/0159948 A1 | 5/2021 | Li et al. | |
| 2021/0218537 A1 | 7/2021 | Chen et al. | |
| 2022/0095337 A1 | 3/2022 | Wang et al. | |
| 2023/0006798 A1* | 1/2023 | Lee | H04L 5/0055 |
| 2023/0362932 A1* | 11/2023 | Yeo | H04L 5/0055 |

FOREIGN PATENT DOCUMENTS

| | | | |
|---|---|---|---|
| CN | 110519019 | A | 11/2019 |
| CN | 110635870 | A | 12/2019 |
| CN | 110830151 | A | 2/2020 |
| CN | 111092695 | A | 5/2020 |
| CN | 111726204 | A | 9/2020 |
| CN | 111865506 | A | 10/2020 |
| EP | 4280505 | A1 | 11/2023 |
| JP | 2021511744 | A | 5/2021 |
| WO | 2019144932 | A1 | 8/2019 |
| WO | 20200226547 | A | 11/2020 |
| WO | 2021017856 | A1 | 2/2021 |
| WO | 2022119394 | A1 | 6/2022 |

OTHER PUBLICATIONS

Ericsson, "Miscellaneous non-controversial corrections Set IX" 3GPP TSG-RAN WG2 Meeting #113e, R2-2101286, Jan. 25-Feb. 5, 2021, Electronic Meeting.

Xiao Qinghua, Mao Zhuohua, Ling Wenjie, Zhang Jianguo / Huaxin Post & Telecom Consulting and Designing Institute Co, Ltd, Hangzhou 310014, China; TD-LTE Comprehensive Analysis of TD-LTE Capacity Capability; Apr. 2012; VoIP.

* cited by examiner

| Row index (Row index, RI) | k0 | Start | Length | Mapping type |
|---|---|---|---|---|
| 0 | 0 | #2 | 4 | B |
| 1 | 0 | #6 | 4 | B |
| 2 | 0 | #10 | 4 | B |
| 3 | 0 | #0 | 13 | A |
| 4 | 0 | #4 | 2 | B |

| Row index (Row index, RI) | k0 | Start | Length | Mapping type |
|---|---|---|---|---|
| 0 | 0 | #6 | 2 | B |
| 1 | 0 | #8 | 2 | B |
| 2 | 0 | #10 | 2 | B |
| 3 | 0 | #12 | 2 | B |

| Row index (Row index, RI) | k0 | Start | Length | Mapping type |
|---|---|---|---|---|
| 0 | 0 | #2 | 4 | B |
| 1 | 0 | #6 | 4 | B |
| 2 | 0 | #10 | 4 | B |
| 3 | 0 | #0 | 13 | A |
| 4 | 0 | #4 | 2 | B |
| 5 | 0 | #6 | 2 | B |
| 6 | 0 | #8 | 2 | B |
| 7 | 0 | #10 | 2 | B |
| 8 | 0 | #12 | 2 | B |

METHOD FOR GENERATING SEMI-STATIC HARQ-ACK CODEBOOK, AND TERMINAL

CROSS-REFERENCE TO RELATED APPLICATIONS

This application is a continuation application of PCT International Application No. PCT/CN2022/079863 filed on Mar. 9, 2022, which claims priority to Chinese Patent Application No. 202110262602.4 filed in China on Mar. 10, 2021, both of which are incorporated herein by reference in their entireties.

TECHNICAL FIELD

This application pertains to the field of wireless communication technologies, and specifically, to a method for generating a semi-static HARQ-ACK codebook, and a terminal.

BACKGROUND

Entire information about hybrid automatic repeat request acknowledgment (HARQ-ACK) fed back by user equipment (UE, also referred to as terminal) on a hybrid automatic repeat request (HARQ) feedback resource (physical uplink control channel (PUCCH) or physical uplink shared channel (PUSCH)) is referred to as an HARQ-ACK codebook.

The semi-static HARQ-ACK codebook is also referred to as a type 1 HARQ-ACK codebook. A size of the codebook is unrelated to actual scheduling of physical downlink shared channel (PDSCH) or transmission of physical downlink control channel (PDCCH), but depends on a configuration of radio resource control (RRC) or a predefined parameter. When an RRC parameter pdsch-HARQ-ACK-Codebook=semi-static, the RRC parameter is configured as the semi-static HARQ-ACK codebook.

A method for generating a semi-static HARQ-ACK codebook includes the following steps:

(1) Determine a $K_1$ set associated with an active uplink bandwidth part (UL BWP).

$K_1$ is one of important parameters for determining the HARQ-ACK codebook and refers to a slot or sub-slot offset value between the Physical Downlink Shared Channel and its corresponding feedback resource (PUCCH/PUSCH). For a $K_{1,k}$ value corresponding to a specific PDSCH, a possible set is configured or predefined by RRC, and then a value in the possible set is indicated by a field in the corresponding scheduling downlink control information (DCI) of the PDSCH. Herein, $K_{1,k}$ is the value in the $K_1$ set, where k=0, . . . , M−1, M is the quantity of elements in the $K_1$ set associated with the active UL BWP, that is, cardinality of the $K_1$ set or a cardinal number of the $K_1$ set.

(2) Based on the $K_1$ set associated with the active UL BWP, determine the candidate PDSCH reception occasion.

Specifically, for each $K_{1,k}$ value in the $K_1$ set associated with the active UL BWP, the candidate PDSCH reception occasion in a slot corresponding to the $K_{1,k}$ value is determined based on a time domain resource assignment (TDRA) table corresponding to the PDSCH.

(3) Determine the semi-static HARQ-ACK codebook based on the candidate PDSCH reception occasion.

When the UE supports simultaneous service transmission of two types of PDSCHs, TDRA tables and/or $K_1$ sets of the two types of PDSCHs can be configured individually. However, in this case, how to determine the semi-static HARQ-ACK codebook is a technical problem to be resolved.

SUMMARY

According to a first aspect, a method for generating a semi-static HARQ-ACK codebook is provided, where the method is performed by a terminal and includes:

determining, based on at least one of a $K_1$ set corresponding to a first PDSCH and a $K_1$ set corresponding to a second PDSCH, a $K_1$ set associated with an active UL BWP;

determining, for each $K_{1,k}$ value in the $K_1$ set associated with the active UL BWP, based on at least one of a TDRA table corresponding to the first PDSCH and a TDRA table corresponding to the second PDSCH, a candidate PDSCH reception occasion in a slot corresponding to the $K_{1,k}$, value where k=0, . . . , M−1, and M is the quantity of elements in the $K_1$ set associated with the active UL BWP; and determining the semi-static HARQ-ACK codebook based on the candidate PDSCH reception occasion.

According to a second aspect, an apparatus for generating a semi-static HARQ-ACK codebook is provided, including:

a first determining module, configured to: based on at least one of a $K_1$ set corresponding to a first PDSCH and a $K_1$ set corresponding to a second PDSCH, determine a $K_1$ set associated with an active UL BWP;

a second determining module, configured to: for each $K_{1,k}$ value in the $K_1$ set associated with the active UL BWP, based on at least one of a TDRA table corresponding to the first PDSCH and a TDRA table corresponding to the second PDSCH, determine a candidate PDSCH reception occasion in a slot corresponding to the $K_{1,k}$ value, wherein k=0, . . . , M−1, and M is the quantity of elements in the $K_1$ set associated with the active UL BWP; and a third determining module, configured to determine the semi-static HARQ-ACK codebook based on the candidate PDSCH reception occasion.

According to a third aspect, a terminal is provided, including a processor, a memory, and a program or instructions stored in the memory and capable of running on the processor, and when the program or instructions are executed by the processor, the steps of the method according to the first aspect are implemented.

According to a fourth aspect, a readable storage medium is provided, where the readable storage medium stores a program or instructions, and when the program or instructions are executed by a processor, the steps of the method according to the first aspect are implemented.

According to a fifth aspect, a chip is provided, where the chip includes a processor and a communications interface, the communications interface is coupled to the processor, and the processor is configured to run a program or instructions of a terminal device, to implement the method according to the first aspect.

According to a sixth aspect, a program product is provided, where the program product is stored in a non-volatile storage medium, and the program product is executed by at least one processor, to implement the method according to the first aspect.

According to a seventh aspect, an embodiment of this application provides a terminal device, configured to perform the steps of the method according to the first aspect.

DESCRIPTION OF EMBODIMENTS

The following clearly describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application without creative efforts shall fall within the protection scope of this application.

In the specification and claims of this application, the terms such as "first" and "second" are intended to distinguish between similar objects but do not necessarily indicate a specific order or sequence. It should be understood that the terms used in this way are interchangeable in appropriate circumstances so that the embodiments of this application can be implemented in other orders than the order illustrated or described herein, and "first" and "second" are usually for distinguishing same-type objects but not limiting the number of objects, for example, there may be one or more first objects. In addition, in the specification and claims, "and/or" represents presence of at least one of connected objects, and the symbol "/" in this specification usually indicates an "or" relationship between associated objects.

It should be noted that techniques described in the embodiments of this application are not limited to a long term evolution (LTE) or LTE-Advanced (LTE-A) system, and may also be applied to various wireless communications systems, for example, code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are often used interchangeably, and the described technology not only can be used for the foregoing system and radio technologies, but also can be used for other systems and radio technologies. However, in the following descriptions, a new radio (NR) system is described for an illustration purpose, and NR terms are used in most of the following descriptions, although these technologies may also be applied to other applications than an NR system application, for example, the 6th generation (6G) communications system.

Figure 1:
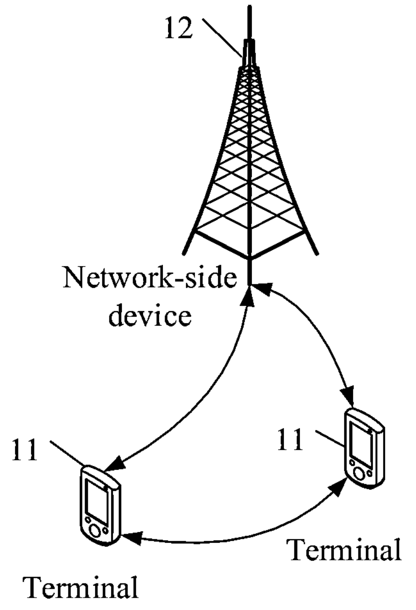
FIG. 1 is a block diagram of a wireless communications system to which the embodiments of this application are applicable.

FIG. 1 is a block diagram of a wireless communication system to which the embodiments of this application are applicable. The wireless communications system includes a terminal 11 and a network-side device 12. The terminal 11 may also be referred to as a terminal device or user equipment (UE). The terminal 11 may be a terminal-side device, such as a mobile phone, a tablet personal computer, a laptop computer or notebook computer, a personal digital assistant (PDA), a palmtop computer, a netbook, an ultra-mobile personal computer (UMPC), a mobile internet device (MID), a wearable device, vehicular user equipment (VUE), or pedestrian user equipment (PUE). The wearable device includes a wrist band, earphones, glasses, and the like. It should be noted that a specific type of terminal 11 is not limited in the embodiments of this application. The network-side device 12 may be a base station or a core network, where the base station may be referred to as a NodeB, an evolved NodeB, an access point, a base transceiver station (BTS), a radio base station, a radio transceiver, a basic service set (Basic Service Set, BSS), an extended service set (ESS), a home NodeB, a home evolved NodeB, a wireless local area network (WLAN) access point, a Wireless Fidelity (WiFi) node, a transmission reception point (TRP), or another appropriate term in the art. As long as the same technical effect is achieved, the base station is not limited to a specific technical term. It should be noted that the base station in the NR system is taken only as an example in the embodiments of this disclosure, but is not used to limit a specific type of the base station.

The following specifically describes the method and terminal for generating a semi-static HARQ-ACK codebook provided in the embodiments of this application through specific embodiments and application scenarios thereof with reference to the accompanying drawings.

Figure 2:
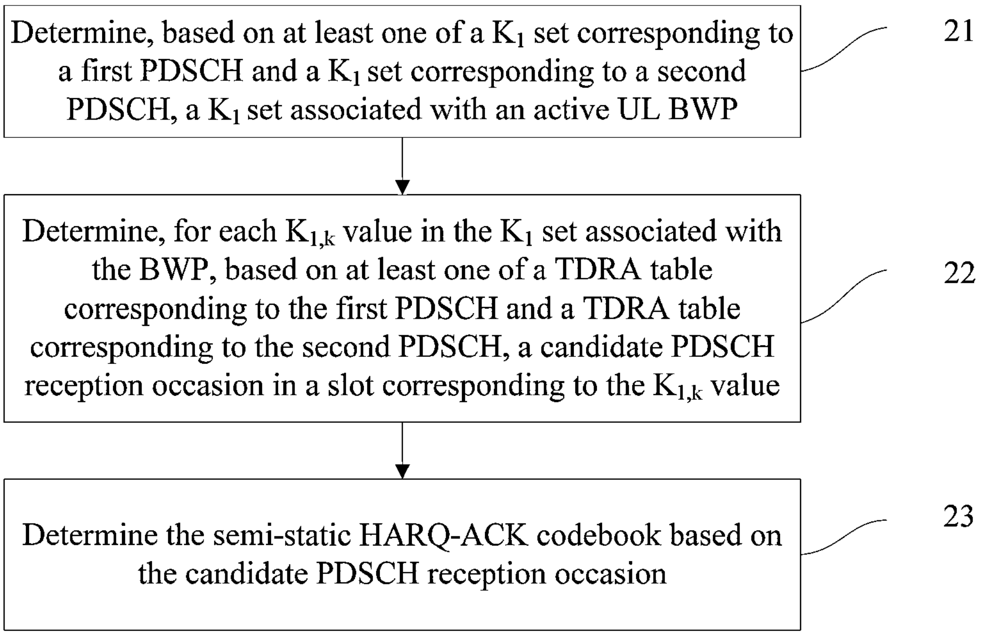
FIG. 2 is a schematic flowchart of a method for generating a semi-static HARQ-ACK codebook according to an embodiment of this application.

Referring to FIG. 2, FIG. 2 shows a method for generating a semi-static HARQ-ACK codebook according to an embodiment of this application. The method is performed by a terminal and includes the following steps:

Step 21: Determine, based on at least one of a $K_1$ set corresponding to a first PDSCH and a $K_1$ set corresponding to a second PDSCH, a $K_1$ set associated with an active UL BWP.

Step 22: Determine, for each $K_{1,k}$ value in the $K_1$ set associated with the active UL BWP, based on at least one of a TDRA table corresponding to the first PDSCH and a TDRA table corresponding to the second PDSCH, a candidate PDSCH reception occasion in a slot corresponding to the $K_{1,k}$ value, where k=0, . . . , M−1, and M is the quantity of elements in the $K_1$ set associated with the active UL BWP.

In this embodiment of this application, based on the $K_1$ set associated with the active UL BWP, an HARQ-ACK feedback window can be determined. That is, for a specific UL slot, a PDSCH or PDCCH that needs to be fed back (for example, a PDCCH indicating SPS PDSCH release or a PDCCH indicating Scell dormancy) can only be transmitted in a slot within the HARQ-ACK feedback window. In other words, in the UL slot, only the PDSCH or PDCCH transmitted within the HARQ-ACK feedback window needs to be fed back.

Figure 3:
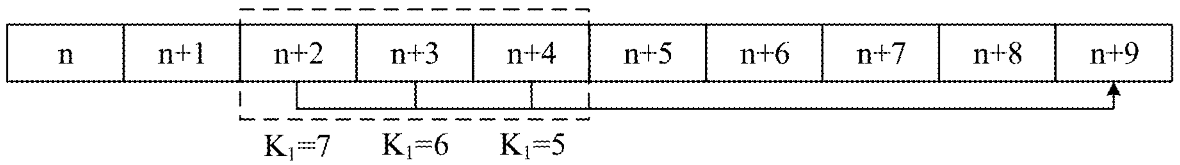
FIG. 3 is a schematic structural diagram of an HARQ-ACK feedback window according to an embodiment of this application.

Referring to FIG. 3, assuming that the $K_1$ set associated with the active UL BWP is {5, 6, 7} an HARQ-ACK feedback window corresponding to a slot of n+9 is: n+4 to n+2, where an offset value $K_{1,k}$ of n+2 and n+9 is 7, an offset value $K_{1,k}$ of n+3 and n+9 is 6, and an offset value $K_{1,k}$ of n+4 and n+9 is 5.

Step 23: Determine the semi-static HARQ-ACK codebook based on the candidate PDSCH reception occasion.

This embodiment of this application illustrates the method of determining a semi-static HARQ-ACK codebook in a case that the terminal supports simultaneous transmission of the first PDSCH and the second PDSCH, which can optimize the method of determining a semi-static HARQ-ACK codebook.

In this embodiment of this application, optionally, based on at least one of a $K_1$ set corresponding to a first PDSCH and a $K_1$ set corresponding to a second PDSCH, determining a $K_1$ set associated with an active UL BWP includes one of the following:

(1) using the $K_1$ set corresponding to the first PDSCH as the $K_1$ set associated with the active UL BWP.

Optionally, the $K_1$ set corresponding to the second PDSCH is a subset of the $K_1$ set corresponding to the first PDSCH.

(2) using the $K_1$ set corresponding to the second PDSCH as the $K_1$ set associated with the active UL BWP.

Optionally, the $K_1$ set corresponding to the first PDSCH is a subset of the $K_1$ set corresponding to the second PDSCH.

(3) using a union set of the $K_1$ set corresponding to the first PDSCH and the $K_1$ set corresponding to the second PDSCH as the $K_1$ set associated with the active UL BWP.

This embodiment of this application illustrates the method for determining the $K_1$ set associated with the active UL BWP in a case that the terminal supports simultaneous transmission of the first PDSCH and the second PDSCH.

In this embodiment of this application, optionally, the determining, based on at least one of a TDRA table corresponding to the first PDSCH and a TDRA table corresponding to the second PDSCH, a candidate PDSCH reception occasion in a slot corresponding to the $K_{1,k}$ value includes at least one of the following:

- in a case that the $K_{1,k}$ value belongs to an intersection set of the $K_1$ set corresponding to the first PDSCH and the $K_1$ set corresponding to the second PDSCH, determining, based on a union set of a row index of the TDRA table corresponding to the first PDSCH and a row index of the TDRA table corresponding to the second PDSCH, the candidate PDSCH reception occasion in the slot corresponding to the $K_{1,k}$ value; and
- in a case that the $K_{1,k}$ value does not belong to the intersection set, determining, based on the row index of the TDRA table corresponding to the first PDSCH or the row index of the TDRA table corresponding to the second PDSCH, the candidate PDSCH reception occasion in the slot corresponding to the $K_{1,k}$ value.

In this embodiment of this application, the union set of the TDRA table corresponding to the first PDSCH and the TDRA table corresponding to the second PDSCH is used to determine the candidate PDSCH reception occasion in the slot corresponding to the $K_{1,k}$ value only in a case the $K_{1,k}$ value in $K_1$ set associated with the active UL BWP belongs to the intersection set of the $K_1$ set corresponding to the first PDSCH and the $K_1$ set corresponding to the second PDSCH; and in a case that the $K_{1,k}$ value does not belong to the intersection set, only the TDRA table corresponding to the first PDSCH or the TDRA table corresponding to the second PDSCH is used to determine the candidate PDSCH reception occasion in the slot corresponding to the $K_{1,k}$ value, which can effectively reduce the size of the semi-static HARQ-ACK codebook.

In this embodiment of this application, optionally, in a case that the $K_{1,k}$ value does not belong to the intersection set, based on the row index of the TDRA table corresponding to the first PDSCH or the row index of the TDRA table corresponding to the second PDSCH, the determining the candidate PDSCH reception occasion in the slot corresponding to the $K_{1,k}$ value includes at least one of the following:

- in a case that the $K_{1,k}$ value belongs to the $K_1$ set corresponding to the first PDSCH, determining, based on the row index of the TDRA table corresponding to the first PDSCH, the candidate PDSCH reception occasion in the slot corresponding to the $K_{1,k}$ value; and
- in a case that the $K_{1,k}$ value belongs to the $K_1$ set corresponding to the second PDSCH, determining, based on the row index of the TDRA table corresponding to the second PDSCH, the candidate PDSCH reception occasion in the slot corresponding to the $K_{1,k}$ value.

In this embodiment of this application, in a case that a sub-slot such as subslotLengthForPUCCH is configured for the UE, the slot in the foregoing embodiment can be replaced with the sub-slot to determine, for example, a candidate PDSCH reception occasion in the sub-slot corresponding to the $K_{1,k}$ value.

In the foregoing embodiment of this application, optionally, the first PDSCH and the second PDSCH correspond to different TDRA tables and/or $K_1$ sets.

In the foregoing embodiment of this application, optionally, the first PDSCH is a unicast PDSCH, and the second PDSCH is a multicast PDSCH.

It should be noted that in the present application, the first PDSCH and the second PDSCH respectively represent two different types of PDSCHs, for example, the multicast PDSCH and the unicast PDSCH, or a PDSCH with a high priority and a PDSCH with a low priority. The terminal can determine the first PDSCH or the second PDSCH through a format of the DCI for scheduling the PDSCH, a control resource set (CORESET) to which the DCI belongs, a search space in which the DCI is located, or a scrambling RNTI of the PDSCH; or an RNTI for scrambling the CRC of the DCI for scheduling the PDSCH. This is not specifically limited in the present application.

Currently, a broadcast or multicast feature is introduced to the new radio (NR) technology. Broadcast and multicast services are mainly transmitted through the multicast PDSCH (also referred to as the broadcast PDSCH or a group-common PDSCH). The UE can receive the multicast PDSCH and the unicast PDSCH simultaneously, and TDRA tables and/or $K_1$ sets of the multicast PDSCH and the unicast PDSCH can be configured individually. When the UE supports simultaneous transmission of the unicast PDSCH and the multicast PDSCH, in a case that the candidate PDSCH reception occasion is determined directly based on the union set of the TDRA of the unicast PDSCH and the TDRA table of the multicast PDSCH, the size of the HARQ-ACK codebook is unnecessarily increased. Therefore, in a case that the UE supports the simultaneous transmission of the unicast PDSCH and the multicast PDSCH, the semi-static HARQ-ACK codebook can be determined in the method for generating a semi-static HARQ-ACK codebook described in the foregoing embodiment of this application, to optimize the method for determining the semi-static HARQ-ACK codebook. It should be noted that supporting the simultaneous transmission of the unicast PDSCH and the multicast PDSCH herein means supporting transmission of two types of services. Within a period of time, the UE can receive both the unicast PDSCH and the multicast PDSCH, which does not mean transmission of the unicast PDSCH and the multicast PDSCH on overlapped time domain symbols.

An example that the first PDSCH is a unicast PDSCH and the second PDSCH is a multicast PDSCH is provided below to describe the method for generating a semi-static HARQ-ACK codebook in this embodiment of this application.

Figure 4:
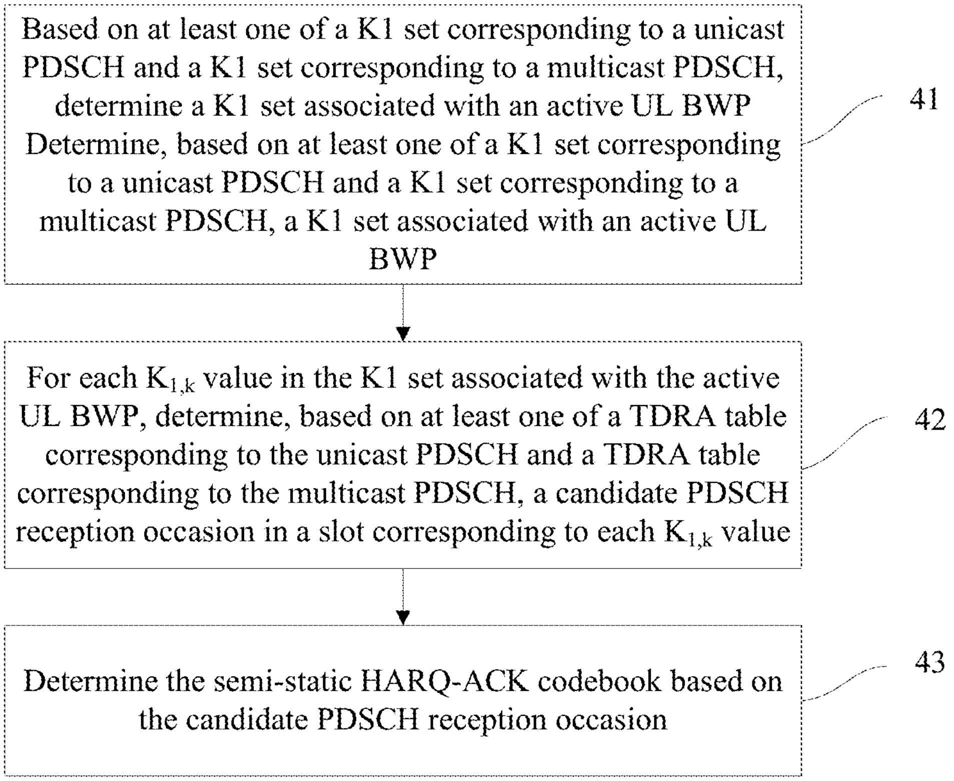
FIG. 4 is a schematic flowchart of a method for generating a semi-static HARQ-ACK codebook according to another embodiment of this application.

Referring to FIG. 4, a method for generating a semi-static HARQ-ACK codebook in this embodiment of this application includes the following steps:

Step 41: Determine, based on at least one of a $K_1$ set corresponding to a unicast PDSCH and a $K_1$ set corresponding to a multicast PDSCH, a $K_1$ set associated with an active UL BWP.

Optionally, the determining a $K_1$ set associated with an active UL BWP includes one of the following:

(1) using the $K_1$ set corresponding to the unicast PDSCH as the $K_1$ set associated with the active UL BWP.

Optionally, the $K_1$ set corresponding to the multicast is a subset of the $K_1$ set corresponding to unicast PDSCH.

(2) using the $K_1$ set corresponding to the multicast PDSCH as the $K_1$ set associated with the active UL BWP.

Optionally, the $K_1$ set corresponding to the unicast is a subset of the $K_1$ set corresponding to the multicast PDSCH.

(3) using a union set of the $K_1$ set corresponding to the unicast and the $K_1$ set corresponding to the multicast PDSCH as the $K_1$ set associated with the active UL BWP.

It is assumed that the $K_1$ set corresponding to the unicast PDSCH is {1, 2, 3, 4, 5, 6, 7, 8}, and the $K_1$ set corresponding to the multicast PDSCH is {6, 8, 10}.

In this embodiment of this application, in a case that the $K_1$ set corresponding to the unicast PDSCH is used as the $K_1$ set associated with the active UL BWP, the $K_1$ set associated with the active UL BWP is {1, 2, 3, 4, 5, 6, 7, 8}.

In a case that the $K_1$ set corresponding to the multicast PDSCH is used as the $K_1$ set associated with the active UL BWP, the $K_1$ set associated with the active UL BWP is {6, 8, 10}.

In a case that the union set of the $K_1$ set corresponding to the unicast and the $K_1$ set corresponding to the multicast PDSCH is used as the $K_1$ set associated with the active UL BWP, the $K_1$ set associated with the active UL BWP is {1, 2, 3, 4, 5, 6, 7, 8, 10}.

Step 42: For each $K_{1,k}$ value in the $K_1$ set associated with the active UL BWP, determine, based on at least one of a TDRA table corresponding to the unicast PDSCH and a TDRA table corresponding to the multicast PDSCH, a candidate PDSCH reception occasion in a slot corresponding to each $K_{1,k}$ value, where k=0, . . . , M−1, and M is the quantity of elements in the $K_1$ set associated with the active UL BWP.

Optionally, in a case that the $K_{1,k}$ value belongs to an intersection set of the $K_1$ set corresponding to the unicast and the $K_1$ set corresponding to the multicast PDSCH, determine, based on a union set of the TDRA table corresponding to the unicast PDSCH and the TDRA table corresponding to the multicast PDSCH, the candidate PDSCH reception occasion in the slot corresponding to the $K_{1,k}$ value;

in a case that the $K_{1,k}$ value only belongs to the $K_1$ set corresponding to the unicast PDSCH and does not belong to the intersection set of the $K_1$ set corresponding to the unicast and the $K_1$ set corresponding to the multicast PDSCH, determine, based on the TDRA table corresponding to the unicast PDSCH, the candidate PDSCH reception occasion in the slot corresponding to the $K_{1,k}$ value; and in a case that the $K_{1,k}$ value only belongs to the $K_1$ set corresponding to the multicast PDSCH and does not belong to the intersection set of the $K_1$ set corresponding to the unicast and the $K_1$ set corresponding to the multicast PDSCH, determine, based on the TDRA table corresponding to the multicast PDSCH, the candidate PDSCH reception occasion in the slot corresponding to the $K_{1,k}$ value.

Figure 5:
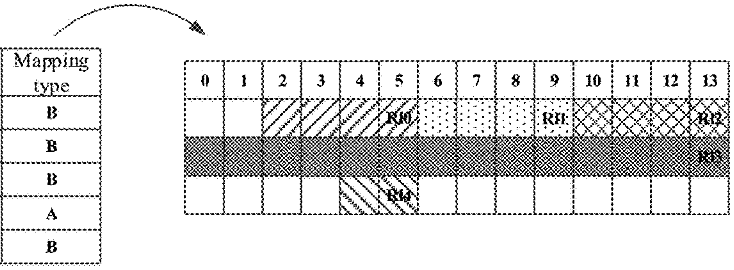
FIG. 5 is a schematic diagram of a TDRA table corresponding to a unicast PDSCH and a corresponding candidate PDSCH reception occasion according to an embodiment of this application.
Figure 6:
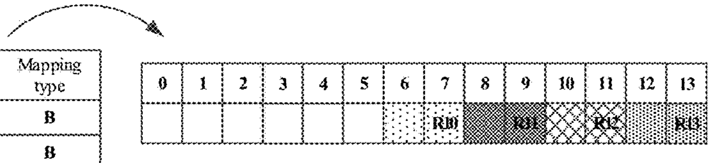
FIG. 6 is a schematic diagram of a TDRA table corresponding to a multicast PDSCH and a corresponding candidate PDSCH reception occasion according to an embodiment of this application.

Referring to FIG. 5, FIG. 5 is a schematic diagram of a TDRA table corresponding to a unicast PDSCH and a corresponding candidate PDSCH reception occasion according to an embodiment of this application. Referring to FIG. 6, FIG. 6 is a schematic diagram of a TDRA table corresponding to a multicast PDSCH and a corresponding candidate PDSCH reception occasion according to an embodiment of this application.

It is assumed that the $K_1$ set that is associated with the active UL BWP determined in Step 41 is {1, 2, 3, 4, 5, 6, 7, 8, 10}.

Figure 7:
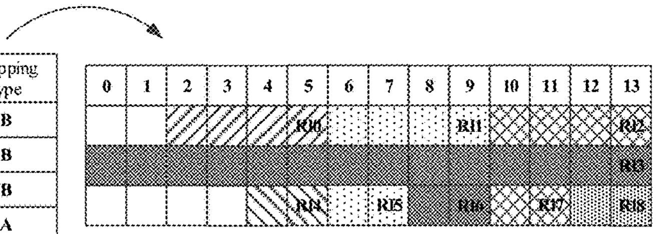
FIG. 7 is a schematic diagram of a union set of TDRA tables corresponding to unicast PDSCH and multicast PDSCHs and a corresponding candidate PDSCH reception occasion according to an embodiment of this application.

In a case that the $K_{1,k}$ value is 6 or 8, the value belongs to an intersection set {6, 8} of the $K_1$ set corresponding to the unicast PDSCH and the $K_1$ set corresponding to the multicast PDSCH. Based on the union set of the TDRA table corresponding to the unicast PDSCH and the TDRA table corresponding to the multicast PDSCH, the terminal determines the candidate PDSCH reception occasion in the slot corresponding to the $K_{1,k}$ value. Referring to FIG. 7, FIG. 7 is a schematic diagram of a union set of TDRA tables corresponding to unicast and multicast PDSCHs and a corresponding candidate PDSCH reception occasion according to an embodiment of this application.

In a case that the $K_{1,k}$ value belongs to {1, 2, 3, 4, 5, 7}, the value only belongs to the $K_1$ set corresponding to the unicast PDSCH. Based on the TDRA table corresponding to the unicast PDSCH, the terminal determines the candidate PDSCH reception occasion in the slot corresponding to the $K_{1,k}$ value.

In a case that the $K_{1,k}$ value is 10, the value only belongs to the $K_1$ set corresponding to the multicast PDSCH. Based on the TDRA table corresponding to the multicast PDSCH, the terminal determines the candidate PDSCH reception occasion in the slot corresponding to the $K_{1,k}$ value.

Step 43: Determine the semi-static HARQ-ACK codebook based on the candidate PDSCH reception occasion.

In the foregoing embodiment of this application, optionally, the determining a candidate PDSCH reception occasion in a slot corresponding to each $K_{1,k}$ value further includes at least one of the following:

(1) excluding a candidate PDSCH reception occasion that is in the TDRA table and that is overlapped with an uplink symbol.

That is, after being compared with uplink and downlink slot format configurations of time division duplexing (TDD), a position of the candidate PDSCH reception occasion is determined to be valid. When a candidate PDSCH receiving position in a specific row of the TDRA is overlapped with the uplink symbol, the position of the candidate PDSCH reception occasion in this row is not a valid reception occasion and needs to be excluded.

Optionally, the uplink symbol is semi-statically configured, for example, uplink symbols configured via parameters TDD-UL-DL-ConfigurationCommon and TDD-UL-DL-ConfigDedicated.

(2) combining candidate PDSCH reception occasions overlapped on time-domain positions, to generate, for example, only 1 HARQ-ACK bit. That is, based on a TDRA table associated with a downlink BWP, rows with non-overlapped time-domain resources are obtained, and only one of overlapped rows is considered.

For example, it is assumed that the $K_1$ set associated with the active UL BWP is {5, 6, 7}. It is also assumed that in a downlink (Downlink, DL) slot corresponding to each $K_{1,k}$, each row of the TDRA table of the PDSCH for determining the HARQ-ACK codebook is shown in FIG. 7.

Figure 8:
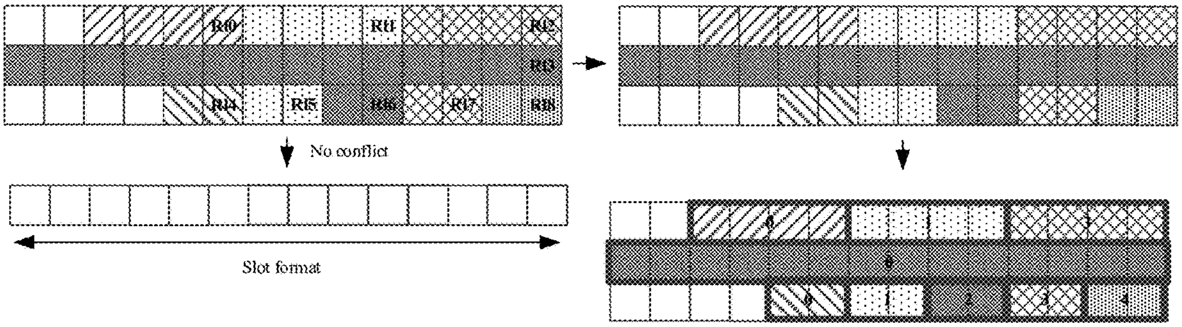
FIG. 8 is a schematic diagram of a method for determining a candidate PDSCH reception occasion in a slot corresponding to $K_{1,k}=7$ according to an embodiment of this application.

When $K_{1,k}$=7, referring to FIG. 8, assuming that all candidate PDSCH reception occasions do not conflict with the uplink symbol, all the candidate PDSCH reception occasions can be retained.

Figure 9:
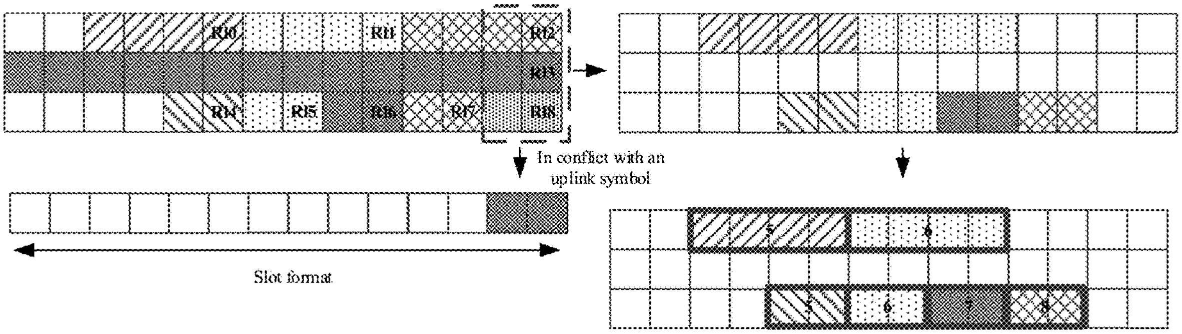
FIG. 9 is a schematic diagram of a method for determining a candidate PDSCH reception occasion in a slot corresponding to $K_{1,k}=6$ according to an embodiment of this application.

When $K_{1,k}$=6, referring to FIG. 9, assuming that PDSCH candidate positions in rows 2, 3, and 8 are overlapped with the uplink symbol, the PDSCH candidate positions are excluded.

When $K_{1,k}$=5, assuming that all sets of candidate PDSCH reception occasions are overlapped with the uplink symbol, all the sets of candidate PDSCH reception occasions are excluded.

Therefore, a finally determined set of candidate PDSCH reception occasions is: MA,c={0,1,2,3,4,5,6,7,8}.

After the candidate PDSCH reception occasion is determined, the HARQ-ACK information also needs to be determined. The HARQ-ACK information can be determined in the following manner:

in a case that the determined set of candidate PDSCH reception occasions includes no scheduled PDSCH reception, the UE feeds back the NACK;

in a case that the determined set of candidate PDSCH reception occasions includes no PDSCH reception indicated to be fed back in a current slot, the UE feeds back the NACK; and in a case that feedback windows of the PDSCHs are overlapped, the PDSCHs are fed back at positions indicated by a DCI format 1-0 or a DCI format 1-1, and the NACK is fed back at another position; and for the set of candidate PDSCH reception occasions with ACK/NACK feedback, based on an obtained candidate PDSCH set of each cell, the number of cells configured by RRC, an HARQ spatial bundling parameter, a code block group (CBG) configuration parameter, and the maximum codeword parameter supported by each cell jointly, the HARQ-ACK codebook is determined.

It should be noted that, the method for generating a semi-static HARQ-ACK codebook provided in this embodiment of this application may be executed by an apparatus for generating a semi-static HARQ-ACK codebook, or a control module for generating a semi-static HARQ-ACK codebook in the apparatus for generating a semi-static HARQ-ACK codebook. In this embodiment of this application, performing the method for generating a semi-static HARQ-ACK codebook by using the apparatus for generating a semi-static HARQ-ACK codebook is used as an example to illustrate the apparatus for generating a semi-static HARQ-ACK codebook provided in this embodiment of this application.

Figure 10:
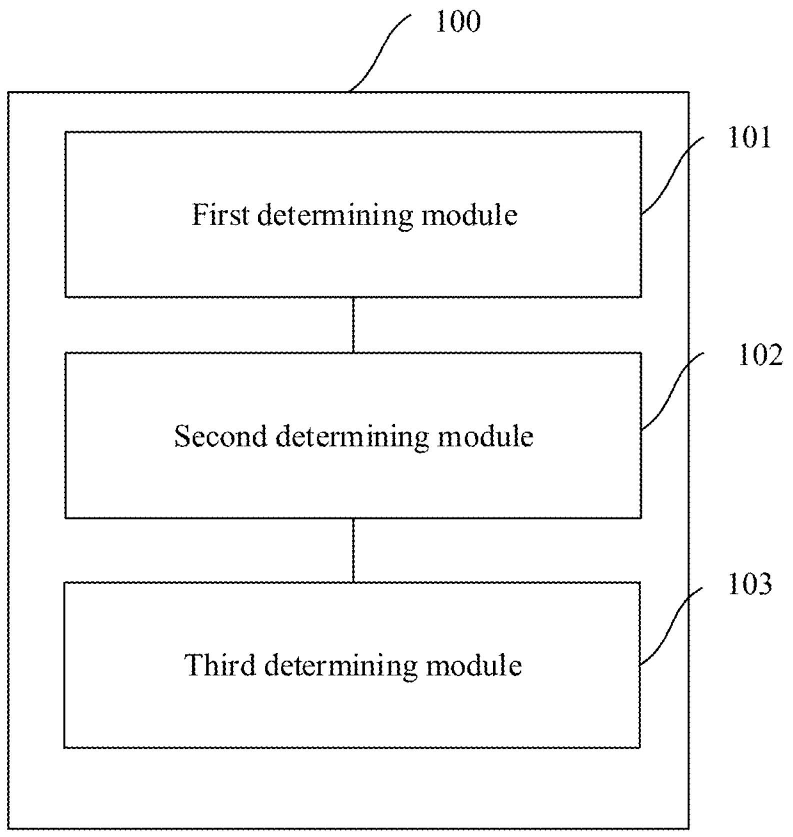
FIG. 10 is a schematic structural diagram of an apparatus for generating a semi-static HARQ-ACK codebook according to an embodiment of this application.

Referring to FIG. 10, an embodiment of this application further provides an apparatus 100 for generating a semi-static HARQ-ACK codebook, including:

a first determining module 101, configured to: determine, based on at least one of a $K_1$ set corresponding to a first PDSCH and a $K_1$ set corresponding to a second PDSCH, a $K_1$ set associated with an active UL BWP;

a second determining module 102, configured to: for each $K_{1,k}$ value in the $K_1$ set associated with the active UL BWP, determine, based on at least one of a TDRA table corresponding to the first PDSCH and a TDRA table corresponding to the second PDSCH, a candidate PDSCH reception occasion in a slot corresponding to the $K_{1,k}$ value, where k=0, . . . , M−1, and M is the quantity of elements in the $K_1$ set associated with the active UL BWP; and a third determining module 103, configured to determine the semi-static HARQ-ACK codebook based on the candidate PDSCH reception occasion.

This embodiment of this application illustrates the method of determining a semi-static HARQ-ACK codebook in a case that the terminal supports simultaneous transmission of the first PDSCH and the second PDSCH, which can optimize the method of determining a semi-static HARQ-ACK codebook.

Optionally, the first determining module 101 performs one of the following:

using the $K_1$ set corresponding to the first PDSCH as the $K_1$ set associated with the active UL BWP;

using the $K_1$ set corresponding to the second PDSCH as the $K_1$ set associated with the active UL BWP; and using a union set of the $K_1$ set corresponding to the first PDSCH and the $K_1$ set corresponding to the second PDSCH as the $K_1$ set associated with the active UL BWP.

Optionally, the second determining module 102 is configured to perform at least one of the following:

in a case that the $K_{1,k}$ value belongs to an intersection set of the $K_1$ set corresponding to the first PDSCH and the $K_1$ set corresponding to the second PDSCH, determining, based on a union set of a row index of the TDRA table corresponding to the first PDSCH and a row index of the TDRA table corresponding to the second PDSCH, the candidate PDSCH reception occasion in the slot corresponding to the $K_{1,k}$ value; and in a case that the $K_{1,k}$ value does not belong to the intersection set, determining, based on the row index of the TDRA table corresponding to the first PDSCH or the row index of the TDRA table corresponding to the second PDSCH, the candidate PDSCH reception occasion in the slot corresponding to the $K_{1,k}$ value.

Optionally, the second determining module 102 is configured to perform at least one of the following:

in a case that the $K_{1,k}$ value belongs to the $K_1$ set corresponding to the first PDSCH, determining, based on the row index of the TDRA table corresponding to the first PDSCH, the candidate PDSCH reception occasion in the slot corresponding to the $K_{1,k}$ value; and in a case that the $K_{1,k}$ value belongs to the $K_1$ set corresponding to the second PDSCH, determining, based on the row index of the TDRA table corresponding to the second PDSCH, the candidate PDSCH reception occasion in the slot corresponding to the $K_{1,k}$ value.

Optionally, the first PDSCH and the second PDSCH correspond to different TDRA tables and/or $K_1$ sets.

Optionally, the first PDSCH is a unicast PDSCH, and the second PDSCH is a multicast PDSCH.

The apparatus for generating a semi-static HARQ-ACK codebook in this embodiment of this application may be an apparatus or a component, an integrated circuit, or a chip in a terminal. The apparatus may be a mobile terminal or a non-mobile terminal. For example, the mobile terminal may include but is not limited to the types of the terminal 11 listed above, and the non-mobile terminal may be a server, a network attached storage (NAS), a personal computer (PC), a television (TV), a teller machine, a self-service machine or the like, which are not specifically limited in the embodiments of this application.

The apparatus for generating a semi-static HARQ-ACK codebook in this embodiment of this application may be an apparatus having an operating system. The operating system may be an android operating system, may be an iOS operating system, or may be another possible operating system. This is not specifically limited in the embodiments of this application.

The apparatus for generating a semi-static HARQ-ACK codebook provided in this embodiment of this application can implement each process implemented in the method embodiments in FIG. 2 to FIG. 8, and achieve the same technical effects. To avoid repetition, details are not described herein again.

Figure 11:
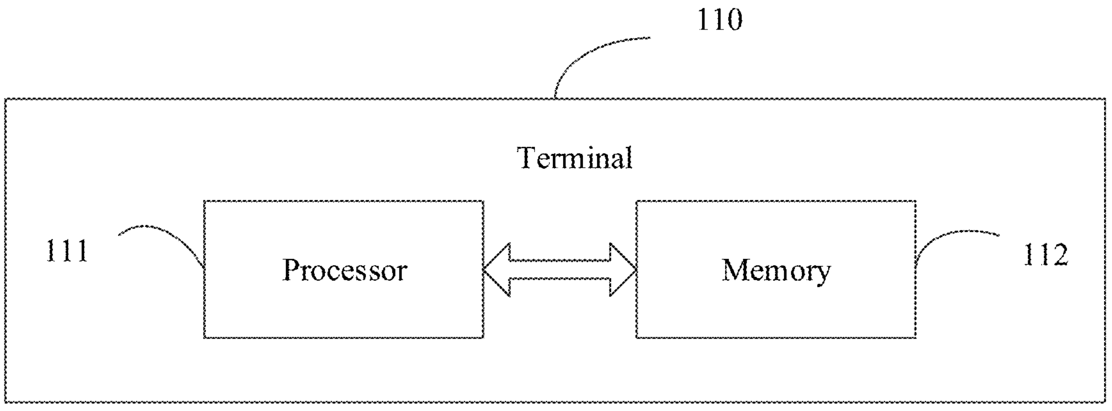
FIG. 11 is a schematic structural diagram of a terminal according to an embodiment of this application.

As shown in FIG. 11, an embodiment of this application further provides a terminal 110, including a processor 111, a memory 112, and a program or instructions stored in the memory 112 and capable of running on the processor 111, where when the program or instructions are executed by the processor 111, the processes of the foregoing embodiment of the method for generating a semi-static HARQ-ACK codebook are implemented, with the same technical effects achieved. To avoid repetition, details are not further described herein.

Figure 12:
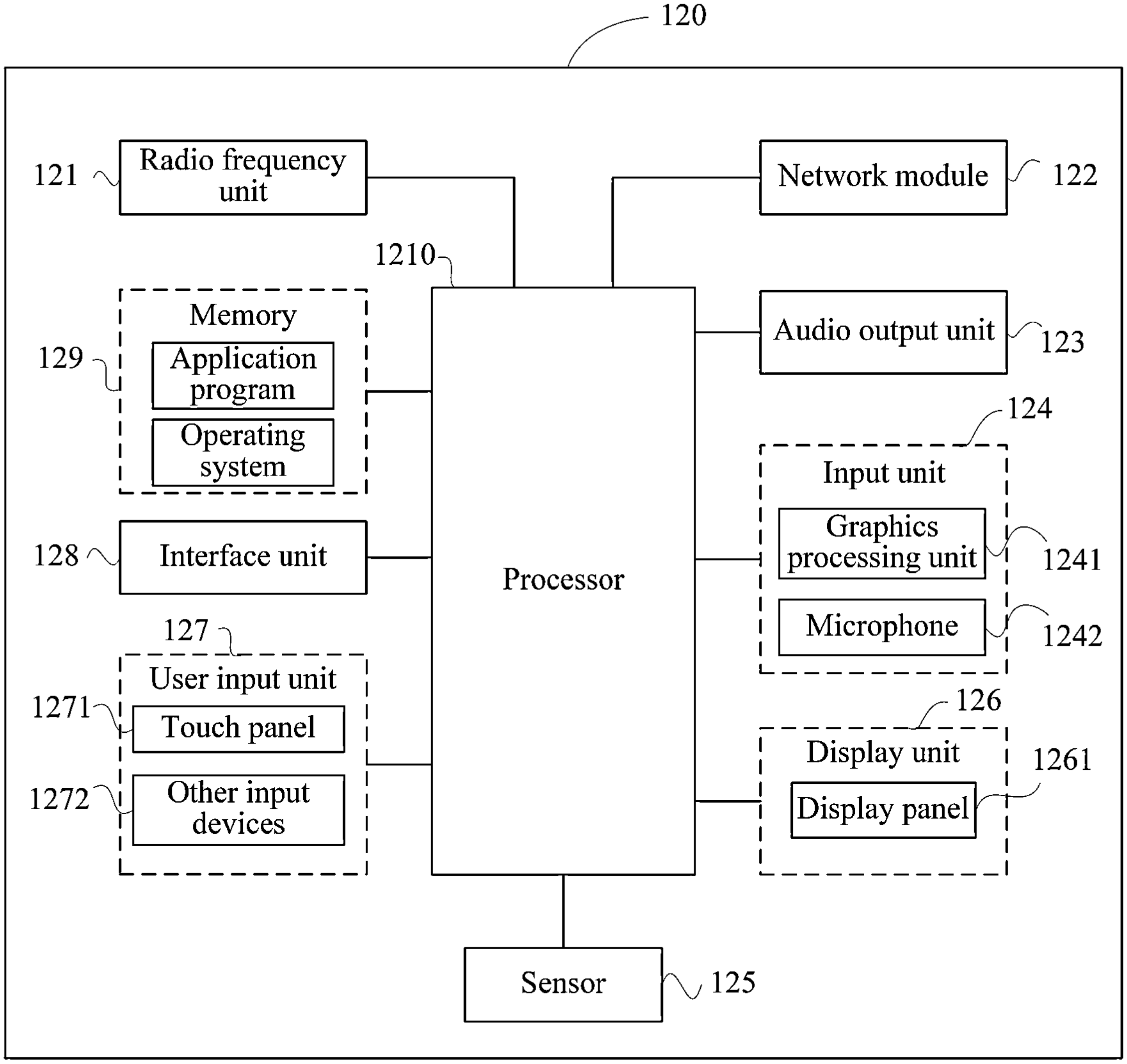
FIG. 12 is a schematic diagram of a hardware structure of a terminal according to an embodiment of this application.

FIG. 12 is a schematic diagram of a hardware structure of a terminal implementing an embodiment of this application. The terminal 120 includes but is not limited to components such as a radio frequency unit 121, a network module 122, an audio output unit 123, an input unit 124, a sensor 125, a display unit 126, a user input unit 127, an interface unit 128, a memory 129, and a processor 1210.

It can be understood by those skilled in the art that the terminal 120 may further include a power supply (for example, a battery) supplying power to the components. The power supply may be logically connected to the processor 1210 via a power management system, so that functions such as charge management, discharge management, and power consumption management are implemented by using the power management system. The structure of the terminal shown in FIG. 12 does not constitute any limitation on the terminal, and the terminal may include more or fewer components than shown in the figure, or combine some of the components, or have different arrangements of the components. Details are not described herein.

It should be understood that in this embodiment of this application, the input unit 124 may include a graphics processing unit (GPU) 1241 and a microphone 1242. The graphics processing unit 1241 processes image data of a static picture or a video that is obtained by an image capture apparatus (for example, a camera) in a video capture mode or an image capture mode. The display unit 126 may include a display panel 1261. The display panel 1261 may be configured in a form of a liquid crystal display, an organic light-emitting diode display, or the like. The user input unit 127 includes a touch panel 1271 and other input devices 1272. The touch panel 1271 is also referred to as a touch-screen. The touch panel 1271 may include two parts: a touch detection apparatus and a touch controller. The other input devices 1272 may include but are not limited to a physical keyboard, a functional button (such as a volume control button or a power on/off button), a trackball, a mouse, and a joystick. Details are not described herein.

In this embodiment of this application, the radio frequency unit 121 transmits downlink data received from a network-side device to the processor 1210 for processing, and in addition, transmits uplink data to the network-side device. Generally, the radio frequency unit 121 includes but is not limited to an antenna, at least one amplifier, a transceiver, a coupler, a low noise amplifier, a duplexer, and the like.

The memory 129 may be configured to store software programs or instructions and various data. The memory 129 may include a program or instruction storage area and a data storage area. The program or instruction storage area may store an operating system, an application program or instructions required by at least one function (for example, a sound playback function or an image playback function), and the like. Further, the memory 129 may include a high-speed random access memory, and may further include a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one disk storage device, flash memory device, or other volatile solid-state storage device.

The processor 1210 may include one or more processing units. Optionally, an application processor and a modem processor may be integrated in the processor 1210. The application processor primarily processes an operating system, user interfaces, application programs or instructions, and the like. The modem processor primarily processes radio communication, for example, being a baseband processor. It may be understood that the modem processor may alternatively not be integrated into the processor 1210.

The processor 1210 is configured to: determine, based on at least one of a $K_1$ set corresponding to a first PDSCH and a $K_1$ set corresponding to a second PDSCH, a $K_1$ set associated with an active UL BWP; determine, for each $K_{1,k}$ value in the $K_1$ set associated with the active UL BWP, based on at least one of a row index of a TDRA table corresponding to the first PDSCH and a TDRA table corresponding to the second PDSCH, a candidate PDSCH reception occasion in a slot corresponding to the $K_{1,k}$ value; and determine, based on the candidate PDSCH reception occasion, the semi-static HARQ-ACK codebook, where $k=0, \ldots, M-1$, and M is the quantity of elements in the $K_1$ set associated with the active UL BWP.

This embodiment of this application illustrates the method of determining a semi-static HARQ-ACK codebook in a case that the terminal supports simultaneous transmission of the first PDSCH and the second PDSCH, which can optimize the method of determining a semi-static HARQ-ACK codebook.

Optionally, the processor 1210 is further configured to perform one of the following:

using the $K_1$ set corresponding to the first PDSCH as the $K_1$ set associated with the active UL BWP;

using the $K_1$ set corresponding to the second PDSCH as the $K_1$ set associated with the active UL BWP; and using a union set of the $K_1$ set corresponding to the first PDSCH and the $K_1$ set corresponding to the second PDSCH as the $K_1$ set associated with the active UL BWP.

Optionally, the processor 1210 is further configured to perform at least one of the following:

in a case that the $K_{1,k}$ value belongs to an intersection set of the $K_1$ set corresponding to the first PDSCH and the $K_1$ set corresponding to the second PDSCH, determining, based on a union set of a row index of the TDRA table corresponding to the first PDSCH and a row index of the TDRA table corresponding to the second PDSCH, the candidate PDSCH reception occasion in the slot corresponding to the $K_{1,k}$ value; and in a case that the $K_{1,k}$ value does not belong to the intersection set, determining, based on the row index of the TDRA table corresponding to the first PDSCH or the row index of the TDRA table corresponding to the second PDSCH, the candidate PDSCH reception occasion in the slot corresponding to the $K_{1,k}$ value.

Optionally, the processor 1210 is further configured to perform at least one of the following:

in a case that the $K_{1,k}$ value belongs to the $K_1$ set corresponding to the first PDSCH, determining, based on the row index of the TDRA table corresponding to the first PDSCH, the candidate PDSCH reception occasion in the slot corresponding to the $K_{1,k}$ value; and in a case that the $K_{1,k}$ value belongs to the $K_1$ set corresponding to the second PDSCH, determining, based on the row index of the TDRA table corresponding to the second PDSCH, the candidate PDSCH reception occasion in the slot corresponding to the $K_{1,k}$ value.

Optionally, the first PDSCH and the second PDSCH correspond to different TDRA tables and/or $K_1$ sets.

Optionally, the first PDSCH is a unicast PDSCH, and the second PDSCH is a multicast PDSCH.

An embodiment of this application further provides a readable storage medium, where the readable storage medium stores a program or instructions, and when the program or instructions are executed by a processor, the processes of the foregoing embodiments of the method for generating a semi-static HARQ-ACK codebook are implemented, with the same technical effects achieved. To avoid repetition, details are not described herein again.

The processor is a processor in the terminal described in the foregoing embodiment. The readable storage medium includes a computer-readable storage medium, for example, a computer read-only memory (ROM), a random access memory (RAM), a magnetic disk, or an optical disc.

Another embodiment of this application provides a chip, where the chip includes a processor and a communications interface, the communications interface is coupled to the processor, and the processor is configured to run a program or instructions of the network-side device to implement the processes of the foregoing embodiments of the method for generating a semi-static HARQ-ACK codebook, with the same technical effects achieved. To avoid repetition, details are not described herein again.

It should be understood that the chip mentioned in this embodiment of this application may also be referred to as a system-level chip, a system chip, a chip system, a system-on-chip, or the like.

An embodiment of this application further provides a program product, for example, a computer program product, where the program product is stored in a non-volatile storage medium, and the program product is executed by at least one processor, to implement processes of the foregoing embodiments of the method for generating a semi-static HARQ-ACK codebook, with the same technical effects achieved. To avoid repetition, details are not described herein again.

An embodiment of this application provides a terminal device, configured to perform the processes of embodiments of the foregoing methods, with the same technical effects achieved. To avoid repetition, details are not described herein again.

It should be noted that in this specification, the term "comprise", "include", or any other variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. Without more constraints, an element preceded by "includes a . . . " does not preclude the presence of other identical elements in the process, method, article, or apparatus that includes the element. In addition, it should be noted that the scope of the method and the apparatus in the embodiments of this application is not limited to executing the functions in an order shown or discussed, but may also include executing the functions in a substantially simultaneous manner or in a reverse order, depending on the functions involved. For example, the described methods may be performed in an order different from that described, and steps may alternatively be added, omitted, or combined. In addition, features described with reference to some examples may be combined in other examples.

According to the description of the foregoing implementations, persons skilled in the art can clearly understand that the method in the foregoing embodiments may be implemented by software in combination with a necessary general hardware platform. Certainly, the method in the foregoing embodiments may alternatively be implemented by hardware. However, in many cases, the former is a preferred implementation. Based on such an understanding, the technical solutions of this application essentially, or the part contributing to the prior art may be implemented in a form of a software product. The software product is stored in a storage medium (for example, ROM/RAM, a magnetic disk, or an optical disc), and includes several instructions for instructing a terminal (which may be a mobile phone, a computer, a server, an air conditioner, a network device, or the like) to perform the method described in the embodiments of this application.

The foregoing describes the embodiments of this application with reference to the accompanying drawings. However, this application is not limited to the foregoing specific implementations. These specific implementations are merely illustrative rather than restrictive. Inspired by this application, persons of ordinary skill in the art may develop many other forms without departing from the essence of this application and the protection scope of the claims, and all such forms shall fall within the protection scope of this application.

What is claimed is:

1. A method for generating a semi-static hybrid automatic repeat request acknowledgment (HARQ-ACK) codebook, performed by a terminal and comprising:

determining, based on at least one of a $K_1$ set corresponding to a first physical downlink shared channel (PDSCH) and a $K_1$ set corresponding to a second PDSCH, a $K_1$ set associated with an active uplink bandwidth part (UL BWP);

determining, for each $K_{1,k}$ value in the $K_1$ set associated with the active UL BWP, based on at least one of a time domain resource assignment (TDRA) table corresponding to the first PDSCH and a TDRA table corresponding to the second PDSCH, a candidate PDSCH reception occasion in a slot corresponding to the $K_{1,k}$ value, wherein k=0, . . . , M−1, and M is a quantity of elements in the $K_1$ set associated with the active UL BWP;

determining the semi-static HARQ-ACK codebook based on the candidate PDSCH reception occasion; and feeding back, on a feedback resource, the semi-static HARQ-ACK codebook;

wherein the determining, based on at least one of a TDRA table corresponding to the first PDSCH and a TDRA table corresponding to the second PDSCH, a candidate PDSCH reception occasion in a slot corresponding to the $K_{1,k}$ value comprises at least one of the following:

responsive to determining that the $K_{1,k}$ value belongs to an intersection set of the $K_1$ set corresponding to the first PDSCH and the $K_1$ set corresponding to the second PDSCH, determining, based on a union set of a row index of the TDRA table corresponding to the first PDSCH and a row index of the TDRA table corresponding to the second PDSCH, the candidate PDSCH reception occasion in the slot corresponding to the $K_{1,k}$ value; or responsive to determining that the $K_{1,k}$ value does not belong to the intersection set, determining, based on the row index of the TDRA table corresponding to the first PDSCH or the row index of the TDRA table corresponding to the second PDSCH, the candidate PDSCH reception occasion in the slot corresponding to the $K_{1,k}$ value.

2. The method according to claim 1, wherein responsive to determining that the $K_{1,k}$ value does not belong to the intersection set, the determining, based on the row index of the TDRA table corresponding to the first PDSCH or the row index of the TDRA table corresponding to the second PDSCH, the candidate PDSCH reception occasion in the slot corresponding to the $K_{1,k}$ value comprises at least one of the following:

responsive to determining that the $K_{1,k}$ value belongs to the $K_1$ set corresponding to the first PDSCH, determining, based on the row index of the TDRA table corresponding to the first PDSCH, the candidate PDSCH reception occasion in the slot corresponding to the $K_{1,k}$ value; or responsive to determining that the $K_{1,k}$ value belongs to the $K_1$ set corresponding to the second PDSCH, determining, based on the row index of the TDRA table corresponding to the second PDSCH, the candidate PDSCH reception occasion in the slot corresponding to the $K_{1,k}$ value.

3. The method according to claim 1, wherein the first PDSCH and the second PDSCH correspond to different DCI formats.

4. The method according to claim 1, wherein the determining, based on at least one of a $K_1$ set corresponding to a first PDSCH and a $K_1$ set corresponding to a second PDSCH, a $K_1$ set associated with an active UL BWP comprises one of the following:

using a union set of the $K_1$ set corresponding to the first PDSCH and the $K_1$ set corresponding to the second PDSCH as the $K_1$ set associated with the active UL BWP;

using the $K_1$ set corresponding to the first PDSCH as the $K_1$ set associated with the active UL BWP; or using the $K_1$ set corresponding to the second PDSCH as the $K_1$ set associated with the active UL BWP.

5. The method according to claim 1, wherein the first PDSCH is a unicast PDSCH, and the second PDSCH is a multicast PDSCH.

6. The method according to claim 1, wherein the first PDSCH and the second PDSCH correspond to different TDRA tables and/or $K_1$ sets.

7. A terminal, comprising a processor, a memory, and an instruction stored in the memory and capable of running on the processor, wherein the instruction, when executed by the processor, implements:

determining, based on at least one of a $K_1$ set corresponding to a first physical downlink shared channel (PDSCH) and a $K_1$ set corresponding to a second PDSCH, a $K_1$ set associated with an active uplink bandwidth part (UL BWP);

determining, for each $K_{1,k}$ value in the $K_1$ set associated with the active UL BWP, based on at least one of a time domain resource assignment (TDRA) table corresponding to the first PDSCH and a TDRA table corresponding to the second PDSCH, a candidate PDSCH reception occasion in a slot corresponding to the $K_{1,k}$ value, wherein k=0, . . . , M−1, and M is a quantity of elements in the $K_1$ set associated with the active UL BWP;

determining the semi-static HARQ-ACK codebook based on the candidate PDSCH reception occasion; and feeding back, on a feedback resource, the semi-static HARQ-ACK codebook;

wherein the determining, based on at least one of a TDRA table corresponding to the first PDSCH and a TDRA table corresponding to the second PDSCH, a candidate PDSCH reception occasion in a slot corresponding to the $K_{1,k}$ value comprises at least one of the following:

responsive to determining that the $K_{1,k}$ value belongs to an intersection set of the $K_1$ set corresponding to the first PDSCH and the $K_1$ set corresponding to the second PDSCH, determining, based on a union set of a row index of the TDRA table corresponding to the first PDSCH and a row index of the TDRA table corresponding to the second PDSCH, the candidate PDSCH reception occasion in the slot corresponding to the $K_{1,k}$ value; or responsive to determining that the $K_{1,k}$ value does not belong to the intersection set, determining, based on the row index of the TDRA table corresponding to the first PDSCH or the row index of the TDRA table corresponding to the second PDSCH, the candidate PDSCH reception occasion in the slot corresponding to the $K_1$, k value.

8. The terminal according to claim 7, wherein responsive to determining that the $K_{1,k}$ value does not belong to the intersection set, the determining, based on the row index of the TDRA table corresponding to the first PDSCH or the row index of the TDRA table corresponding to the second PDSCH, the candidate PDSCH reception occasion in the slot corresponding to the $K_{1,k}$ value comprises at least one of the following:

responsive to determining that the $K_{1,k}$ value belongs to the $K_1$ set corresponding to the first PDSCH, determining, based on the row index of the TDRA table corresponding to the first PDSCH, the candidate PDSCH reception occasion in the slot corresponding to the $K_{1,k}$ value; or responsive to determining that the $K_{1,k}$ value belongs to the $K_1$ set corresponding to the second PDSCH, determining, based on the row index of the TDRA table corresponding to the second PDSCH, the candidate PDSCH reception occasion in the slot corresponding to the $K_{1,k}$ value.

9. The terminal according to claim 7, wherein the first PDSCH and the second PDSCH correspond to different DCI formats.

10. The terminal according to claim 7, wherein the determining, based on at least one of a $K_1$ set corresponding to a first PDSCH and a $K_1$ set corresponding to a second PDSCH, a $K_1$ set associated with an active UL BWP comprises one of the following:

using a union set of the $K_1$ set corresponding to the first PDSCH and the $K_1$ set corresponding to the second PDSCH as the $K_1$ set associated with the active UL BWP;

using the $K_1$ set corresponding to the first PDSCH as the $K_1$ set associated with the active UL BWP; or using the $K_1$ set corresponding to the second PDSCH as the $K_1$ set associated with the active UL BWP.

11. The terminal according to claim 7, wherein the first PDSCH is a unicast PDSCH, and the second PDSCH is a multicast PDSCH.

12. The terminal according to claim 7, wherein the first PDSCH and the second PDSCH correspond to different TDRA tables and/or $K_1$ sets.

13. A non-transitory readable storage medium, wherein the readable storage medium stores instructions, and the instructions, when executed by a processor, implement:

determining, based on at least one of a $K_1$ set corresponding to a first physical downlink shared channel (PDSCH) and a $K_1$ set corresponding to a second PDSCH, a $K_1$ set associated with an active uplink bandwidth part (UL BWP);

determining, for each $K_{1,k}$ value in the $K_1$ set associated with the active UL BWP, based on at least one of a time domain resource assignment (TDRA) table corresponding to the first PDSCH and a TDRA table corresponding to the second PDSCH, a candidate PDSCH reception occasion in a slot corresponding to the $K_{1,k}$ value, wherein $k=0, \ldots, M-1$, and M is a quantity of elements in the $K_1$ set associated with the active UL BWP;

determining the semi-static HARQ-ACK codebook based on the candidate PDSCH reception occasion;

feeding back, on a feedback resource, the semi-static HARQ-ACK codebook;

wherein the determining, based on at least one of a TDRA table corresponding to the first PDSCH and a TDRA table corresponding to the second PDSCH, a candidate PDSCH reception occasion in a slot corresponding to the $K_{1,k}$ value comprises at least one of the following:

responsive to determining that the $K_{1,k}$ value belongs to an intersection set of the $K_1$ set corresponding to the first PDSCH and the $K_1$ set corresponding to the second PDSCH, determining, based on a union set of a row index of the TDRA table corresponding to the first PDSCH and a row index of the TDRA table corresponding to the second PDSCH, the candidate PDSCH reception occasion in the slot corresponding to the $K_{1,k}$ value; or responsive to determining that the $K_{1,k}$ value does not belong to the intersection set, determining, based on the row index of the TDRA table corresponding to the first PDSCH or the row index of the TDRA table corresponding to the second PDSCH, the candidate PDSCH reception occasion in the slot corresponding to the $K_{1,k}$ value.

14. The storage medium according to claim 13, wherein responsive to determining that the $K_{1,k}$ value does not belong to the intersection set, the determining, based on the row index of the TDRA table corresponding to the first PDSCH or the row index of the TDRA table corresponding to the second PDSCH, the candidate PDSCH reception occasion in the slot corresponding to the $K_{1,k}$ value comprises at least one of the following:

responsive to determining that the $K_{1,k}$ value belongs to the $K_1$ set corresponding to the first PDSCH, determining, based on the row index of the TDRA table corresponding to the first PDSCH, the candidate PDSCH reception occasion in the slot corresponding to the $K_{1,k}$ value; or responsive to determining that the $K_{1,k}$ value belongs to the $K_1$ set corresponding to the second PDSCH, determining, based on the row index of the TDRA table corresponding to the second PDSCH, the candidate PDSCH reception occasion in the slot corresponding to the $K_{1,k}$ value.

15. The storage medium according to claim 13, wherein the first PDSCH and the second PDSCH correspond to different DCI formats.

16. The storage medium according to claim 13, wherein the determining, based on at least one of a $K_1$ set corresponding to a first PDSCH and a $K_1$ set corresponding to a second PDSCH, a $K_1$ set associated with an active UL BWP comprises one of the following:

using a union set of the $K_1$ set corresponding to the first PDSCH and the $K_1$ set corresponding to the second PDSCH as the $K_1$ set associated with the active UL BWP;

using the $K_1$ set corresponding to the first PDSCH as the $K_1$ set associated with the active UL BWP; or using the $K_1$ set corresponding to the second PDSCH as the $K_1$ set associated with the active UL BWP.

17. The storage medium according to claim 13, wherein the first PDSCH is a unicast PDSCH, and the second PDSCH is a multicast PDSCH.

* * * * *